Nov. 29, 1960  A. PIERROT ET AL  2,962,445
RECTANGULAR HYSTERESIS LOOP FERRITES
Filed June 5, 1956  9 Sheets-Sheet 1

Nov. 29, 1960

A. PIERROT ET AL 2,962,445

RECTANGULAR HYSTERESIS LOOP FERRITES

Filed June 5, 1956

United States Patent Office 2,962,445
Patented Nov. 29, 1960

2,962,445

RECTANGULAR HYSTERESIS LOOP FERRITES

Andre Pierrot, Yves C. E. Lescroel, and Bogdan Grabowski, Conflans-Sainte-Honorine, and Charles L. Guillaud, Bellevue, France, assignors to Lignes Telegraphiques & Telephoniques, Paris, France Filed June 5, 1956, Ser. No. 589,521

Claims priority, application France July 1, 1955

8 Claims. (Cl. 252—62.5)

This invention relates to ferromagnetic materials of the ferrite type, having substantially rectangular hysteresis cycles, and to methods for their manufacture. Such materials can be employed in magnetic recording devices known as "memory devices," magnetic control members, magnetic amplifiers, and the like. In these applications, materials according to the invention are used in the form of generally toroidal cores, or at least of closed magnetic circuits, without air-gaps.

Materials with a hysteresis cycle of rectangular form are known, particularly alloys of iron and nickel or of iron and silicon, the magnetic properties of which are frequently rendered anisotropic either by cold rolling, or by heat treatment under a magnetising field. These materials, generally speaking, have high magnetic moments at saturation and low coercive fields.

An important defect of these metallic materials, despite their usually high magnetic moments at saturation, is the low value of their resistivity, which leads to considerable eddy-current losses. These high losses result in an increase of the response time and a deformation of the hysteresis cycle, which then loses its character of rectangularity with frequency increases. Thus, if it be desired to employ such cores at frequencies of several megacycles per second, they must be obtained in very thin form, of the order of a few microns, and their price immediately becomes prohibitive.

Before the present invention is explained some notations and definitions will be given of the magnetic magnitudes which will be used in the following description and it is to be noted that the value of the magnetic moment in gauss hereinafter called "moment" is the product of the value of the moment in c.g.s. electromagnetic units into $4\pi$.

A substantially rectangular hysteresis cycle, plotted for a magnetising field practically reaching saturation, is defined by the following parameters:

$I_s$: saturation moment, in gauss;
$I_r$: remanent or residual moment corresponding to the cycle at saturation, in gauss;
$H_c$: coercive field, corresponding to the cycle at saturation, in oersteds;

$\beta = \dfrac{I_r}{I_s}$: ratio of remanent moment to saturation moment

Furthermore, the following parameters may be used in connection with a work cycle in which the magnetising field varies from a maximum positive value ($+H_m$) to a maximum negative value ($-H_m$):

$I_m$: moment corresponding to the field $H_m$, in gauss;
$B_m$: flux density when the field has the value $H_m$, in gauss;
$B_{rm}$: remanent flux density, in gauss;
$B_{dm}$: final value of flux density when the value of the magnetising field varies from a value $H_m$, comprised between $H_{cm}$ and $2H_{cm}$, to the value $$\left(-\dfrac{H_m}{2}\right)$$

$H_{cm}$: coercive field, in oersteds;

$\beta_m = \dfrac{B_{rm}}{B_m}$: "coefficient of rectangularity";

$R_m = \dfrac{B_{dm}}{B_m}$: "ratio of rectangularity";

$$K_m = \dfrac{B_{rm}+B_m}{B_{rm}-B_{dm}} = \dfrac{\beta_m+1}{\beta_m-R_m}$$

It is also possible, in certain cases, to evaluate the slopes of the substantially vertical and horizontal sides of the hysteresis cycle.

The quantities:

$$P_h = \left(\dfrac{\Delta I}{\Delta H}\right)_h$$

and $$P_v = \left(\dfrac{\Delta I}{\Delta H}\right)_v$$

in which $\Delta I$ and $\Delta H$ are small variations of the moment and of the magnetising field in the vicinity of a given point, are respectively defined in the vicinity of the intersection of the curve representing the hysteresis cycle with the axes of coordinates, $P_h$ corresponding to a zero magnetising field and $P_v$ to a zero moment.

For an ideal rectangular cycle, $P_h$ would tend towards zero and $P_v$ would tend towards infinity.

The permeability $\mu$ is defined as the initial permeability in the demagnetised state.

The magnetostrictive effects may be defined by the value of the coefficient of magnetostriction at saturation $\lambda_s$, which is obtained by extrapolating, for the demagnetised state, the curve of relative variation $$\dfrac{\Delta l}{l}$$

in the direction of the applied field, of the length $l$ of a sample as a function of this field, plotted for very high field strengths.

Another important characteristic is the variation of $B_m$ or $I_s$ as a function of the temperature; it will be defined by a variation coefficient of the flux density in percent per degree:

$$\alpha_B = \dfrac{1}{B_m} \cdot \dfrac{\Delta B_m}{\Delta t} \cdot 10^2$$

in which $B_m$ is the value of the flux density at 20° C.
$\Delta B_m$ is the variation of the flux density between 20° C. and 60° C.
$\Delta t$ is the corresponding shift of temperature, that is, in the present case, $\Delta t = 40°$ C.

The flux densities $B_m$ correspond to a definite field $H_m$, considerably higher than $H_c$.

The Curie point $\theta_c$ is hereinafter defined as the temperature, expressed in degrees centigrade, where the magnetic permeability suddenly falls to 1.

The "response time" is defined by considering two windings, having negligible time constants, placed on a core made of the magnetic material concerned; this core is subjected to the magnetising field $H_m$, comprised between $H_{cm}$ and $2H_{cm}$ and then to a field $$\left(-\dfrac{H_m}{2}\right)$$

a pulse of current the rising time of which is very short (for example, less than 0.1 microsecond), is applied to one of the windings, and causes the value of the magnetising field to pass to the value $(-H_m)$; the "response time" $\tau$ is the time, expressed in microseconds, necessary for the voltage produced in the other winding, starting from zero, to pass through a maximum and return to 10% of the value of this maximum.

The object of the invention is to provide magnetic materials of the ferrite type having, on the one hand, substantially rectangular hysteresis cycles with a coefficient of rectangularity $\beta_m$ at least equal to 0.90 and, on the other hand, high resistivities $\rho$ at least equal to $10^3$ ohms-centimeter.

Materials provided by the invention have moments at saturation $I_s$ of the order of 1,500 to 4,500 gauss, at about 20° C., coercive fields $H_c$ comprised between 0.2 and 3 oersteds, variation coefficients of the flux density as a function of the temperature $\alpha_B$ at most equal to 0.5 and Curie points $\theta_c$ higher than 150° C. Their coefficient of magnetostriction at saturation is negative.

In view of their high resistivity, these materials have negligible eddy-current losses, which makes it possible to use them at high frequencies with very low response times ($\tau \leqslant 5$ microseconds).

The ferromagnetic materials, which are provided by the invention, are ferromagnetic materials of the ferrite type, with a substantially rectangular hysteresis cycle. In accordance with one embodiment of the invention, such materials can be manufactured by compressing a homogeneous mixture of fine powders of metallic oxides and by subjecting the compressed mixture to a heat treatment carried out at a temperature comprised between 900° and 1,350° C., followed by slow cooling. The mixture can be formed of ferric oxide and, if desired, of oxides of trivalent metals of the group including aluminium and chromium, of oxides of at least two bivalent metals of the group including manganese, nickel and copper and, if desired, of oxide of zinc.

In the mixture, the sum of the molecular percentages of the oxides of the trivalent metals is, in further accordance with the invention, comprised between 30 and 52 and the sum of the molecular percentages of the oxides of the trivalent metals other than iron is at most equal to a quarter of the molecular percentage of the ferric oxide. The sum of the molecular percentages of oxides of the manganese, nickel and copper is comprised between 33 and 70; the sum of the molecular percentages of nickel and copper is at least equal to 2 and at most equal to 0.4 times the molecular percentage of the manganese oxide, while the percentage of the nickel oxide is at most equal to 20 and that of the copper oxide at most equal to 15. The molecular percentage of zinc oxide is at most equal to 15.

If the mixture of oxides contains both nickel and copper oxides, the molecular percentage of the copper oxide is at most equal to 10.

The materials used for the initial mixture before grinding, are not necessarily the metal oxides which are mentioned above; for instance, instead of manganese protoxide MnO, a saline oxide $Mn_3O_4$ is used quite often. Nevertheless the amounts of metals introduced will be referred to the number of metal atoms, conventionally evaluated as if the oxides had the compositions indicated in the present description.

The invention will be more particularly explained in the following description of ferrites prepared from mixtures whose starting compositions correspond to the formula:

$$xFe_2O_3, uMnO, vNiO, wCuO, sZnO,$$

where $x$, $u$, $v$, $w$ and $t$ are the molecular percentages which satisfy the following relationships:

$$x+u+v+w+s=100$$
$$30 \leqslant x \leqslant 52$$
$$33 \leqslant u+v+w \leqslant 70$$
$$0 \leqslant v \leqslant 20$$
$$0 \leqslant w \leqslant 15$$
$$2 \leqslant v+w \leqslant 0.4u$$
$$0 \leqslant s \leqslant 15$$

It is well known that the magnetostriction of a mixed ferrite depends on the magnetostriction of each of the ferrites of which it is composed. Among all the ferrites, the ferrite of iron or magnetic oxide of iron $FeO \cdot Fe_2O_3$ (that is $Fe_3O_4$) is the only one which presents a positive coefficient of magnetostriction.

According to the invention, a material with a substantially rectangular hysteresis cycle is obtained by forming a ferrite which has little or no bivalent iron. Moreover, in these ferrites where the molecular percentage of $Fe_2O_3$ is less than or equal to 52, everything takes place as though a part of the manganese oxide were in the form $Mn_2O_3$, in such a way that there is substantially equality between the number of molecules containing metals in the trivalent state and the number of molecules containing metals in the trivalent state and the number of molecules containing metals in the bivalent state.

In the following description, the compositions indicated are starting compositions before the oxides are reduced to fine powder by grinding. The increase in the iron content, due to the wear of the grinder or mill, being for an average grinder about 0.8 molecules of $Fe_2O_3$ per hundred molecules of ground material, the percentages of $Fe_2O_3$ indicated after grinding have to be increased by this quantity. Corrections would have to be made if a grinder were used which wore out more slowly or more quickly.

The invention will next be described in greater detail by means of embodiments given as non-limitative examples and with reference to the attached drawings in which.

Figure 1:
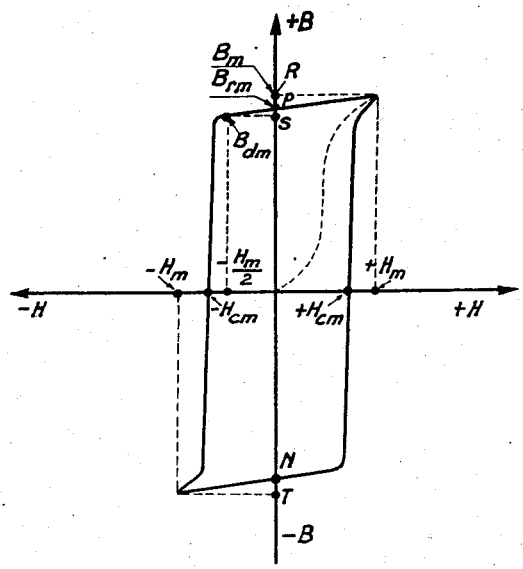
Figure 1 represents a substantially rectangular hysteresis cycle.

In Figure 1, which represents a rectangular hysteresis cycle corresponding to a field $H_m$, the flux density $B_m$ equal to OR, the remanent flux density $B_{rm}$ equal to OP, the flux density $B_{dm}$ equal to OS corresponding to a magnetising field

$$\left(-\frac{H_m}{2}\right)$$

and the coercive field $H_{cm}$ are indicated.

The "coefficient of rectangularity" or $$\beta_m = \frac{B_{rm}}{B_m} = \frac{OP}{OR}$$

the "ratio of rectangularity" or $$R_m = \frac{B_{dm}}{B_m} = \frac{OS}{OR}$$

and the ratio $$K_m = \frac{OP + OT}{OP - OS} = \frac{B_{rm} + B_m}{B_{rm} - B_{dm}}$$

It should be noted that if $\beta_m = 1 - \alpha$ $$R_m \leqslant 1 - \frac{3\alpha}{2}$$

Figure 2:
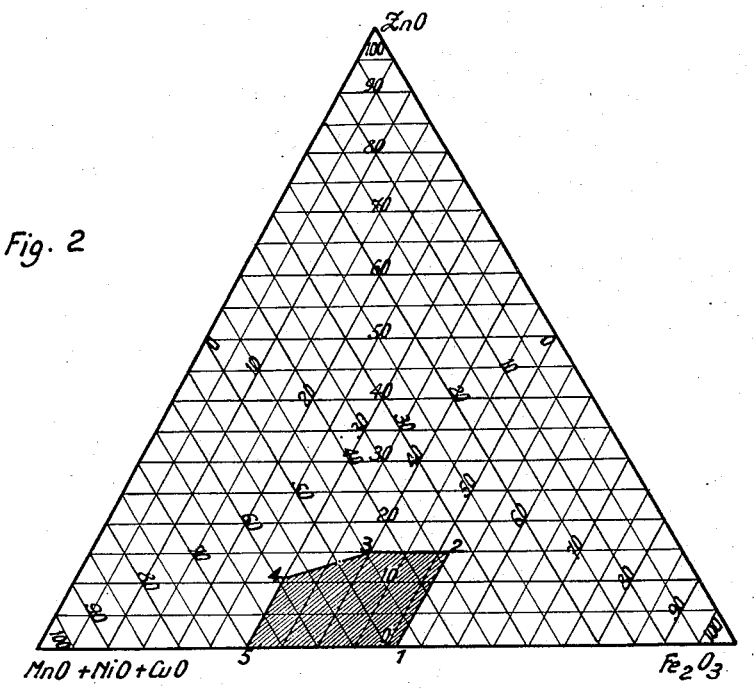
Figure 2 represents a triangular diagram showing the starting compositions of materials according to the invention, in the general case.

Figure 2 represents a triangular diagram corresponding to a material according to the invention, the three components of which are: the $Fe_2O_3$ molecules, the ZnO molecules and the sum of the numbers of MnO, NiO and CuO molecules, the total number of the molecules being equal to 100. The figurative point of the composition with a rectangular hysteresis cycle will have to be within the shaded zones 1, 2, 3, 4 and 5. The limits correspond to the following compositions:

Point 1: $52Fe_2O_3$, $[48-(v+w)]$ MnO, $v$NiO, $w$CuO
Point 2: $52Fe_2O_3$, $[33-(v+w)]$ MnO, $v$NiO, $w$CuO, 15ZnO
Point 3: $40Fe_2O_3$, $[45-(v+w)]$ MnO, $v$NiO, $w$CuO, 15ZnO
Point 4: $30Fe_2O_3$, $[60-(v+w)]$ MnO, $v$NiO, $w$CuO, 10ZnO
Point 5: $30Fe_2O_3$, $[70-(v+w)]$ MnO, $v$NiO, $w$CuO, The reasons for the limits which confine the zone are: (a) To the right of the line formed by points 1 and 2, the coefficient of magnetostriction $\lambda_s$ becomes positive, and therefore the rectangularity of the hysteresis cycle disappears; (b) Above the line formed by points 3 and 2, the ferrite becomes softer because of the high content of zinc, and its Curie point goes down; the rectangularity of the hysteresis cycle is not so good at room temperature; (c) To the left of or beyond the line formed by points 3 and 4, the Curie point also becomes too low; accordingly, $\alpha_B$ can become higher than 0.5 beyond the line 3, 4, while the rectangularity still remains acceptable; (d) Finally, to the left of or beyond the line formed by points 4 and 5, the moment at saturation falls to a value too low to be acceptable.

Figure 3:
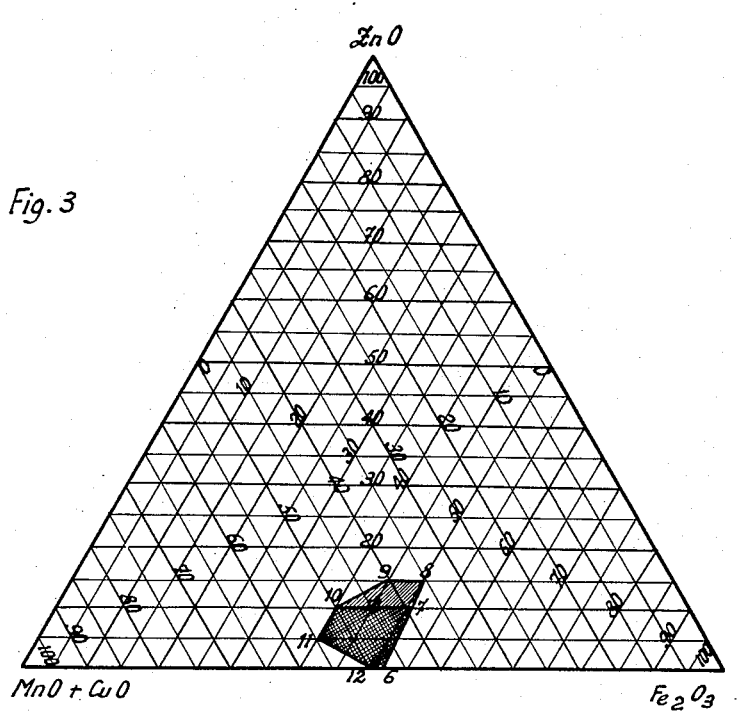
Figure 3 represents a triangular diagram indicating the starting compositions of materials according to the invention, in the case where there is no nickel oxide.

Figure 3 represents, on a triangular diagram, for a ferromagnetic material having the starting composition $$xFe_2O_3, uMnO, wCuO, sZnO$$

the starting compositions according to the invention, in the case where they contain no nickel oxide.

If $2 \leqslant w \leqslant 5$, the zone to be considered is the shaded zone 6, 7, 10, 11, 12.

If $5 \leqslant w \leqslant 15$, the zone to be considered is the total shaded zone 6, 8, 9, 10, 11, 12.

The addition of copper oxide to ferrite makes it possible, in fact, to increase the Curie point of the material, the copper ferrite having a Curie point of the order of 450° C.; accordingly, zinc oxide can be added in greater quantity while maintaining the two aforementioned properties $$\beta_m \geqslant 0.90 \text{ and } \alpha_B \leqslant 0.5$$

The compositions, limiting the diagram 6, 8, 9, 10, 11, 12 are:

Point 6: $52Fe_2O_3$, $(48-w)$ MnO, $w$CuO,
Point 8: $50Fe_2O_3$, $(35-w)$ MnO, $w$Cuo, 15ZnO,
Point 9: $45Fe_2O_3$, $(40-w)$ MnO, $w$CuO, 15ZnO,
Point 10: $40Fe_2O_3$, $(50-w)$ MnO, $w$CuO, 10ZnO,
Point 11: $40Fe_2O_3$, $(55-w)$ MnO, $w$CuO, 5ZnO,
Point 12: $50Fe_2O_3$, $(50-w)$ MnO, $w$CuO.

The shape of the diagram can be explained as follows:

The addition of ZnO makes it possible to increase the moment at saturation of the material so that, with a content of ZnO molecules compared between 5 and 10, it is possible to reduce the content of $Fe_2O_3$ molecules to the order of 40.

For a content of ZnO molecules higher than 10, the zone becomes narrower; the minimum content of $Fe_2O_3$ molecules must be increased in order that $\alpha_B$ be at most equal to 0.5.

Figure 4:
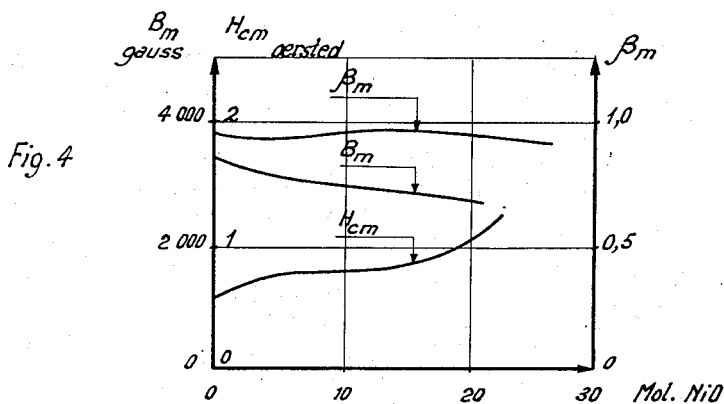
Figure 4 represents the variations of $B_m$, $H_{cm}$ and $\beta_m$ as a function of the molecular percentage of the nickel oxide.

In Figure 4, the variations of $B_m$, $H_{cm}$ and $\beta_m$ of the $50Fe_2O_3$, $(50-v)$MnO, $v$NiO mixtures are represented as a function of the content of $v$ of NiO molecules. The materials which have been examined were annealed at 1240° C., for 4 hours, in pure nitrogen containing 1% in volume of oxygen; cooling takes place in pure nitrogen. The magnetic characteristics have been taken from static cycles, plotted for a field $H_m$ of 2 oersteds. The variation of $\beta_m$ is very low while $B_m$ decreases and $H_{cm}$ increases when $v$ increases.

Figure 5:
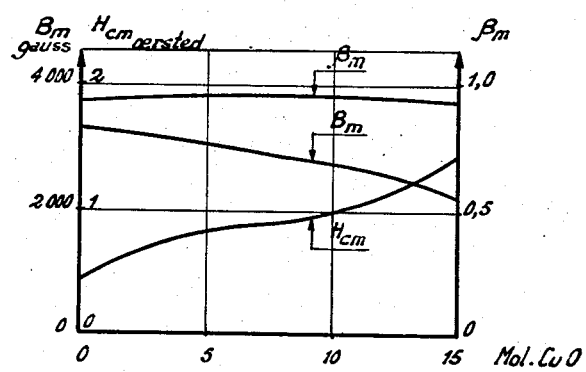
Figure 5 represents the variations of $B_m$, $H_{cm}$ and $\beta_m$ as a function of the molecular percentage of the copper oxide.

Figure 5 represents, in the case of a manganese and copper ferrite, the variation of the characteristics $B_m$, $\beta_m$ and $H_{cm}$ as a function of the molecular percentage $w$ of CuO for a maximum field $H_m = 2$ oersteds; the ferrites which are compared have as a general formula $$50Fe_2O_3, (50-w) \text{ MnO}, w\text{CuO}$$

It should be noted that $B_m$ decreases while $H_{cm}$ increases when the CuO content increases whereas $\beta_m$ does not, practically, vary and remains close to 0.95.

Figure 6:
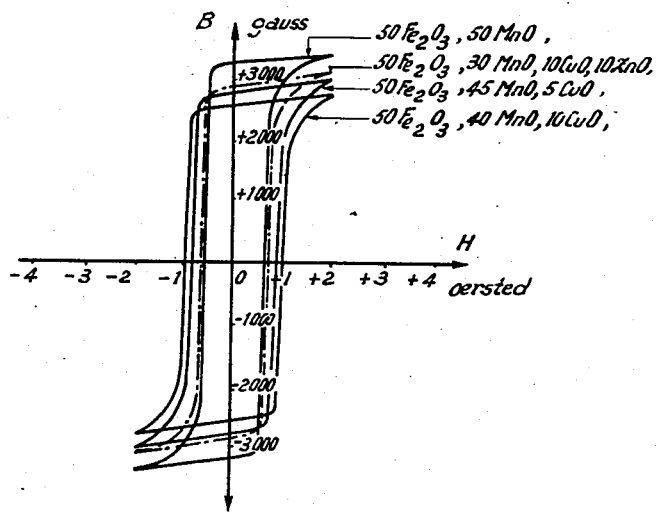
Figure 6 represents the hysteresis cycles of materials of different composition.

Figure 6 represents the hysteresis cycles corresponding to a field $H_m$ of 2 oersteds of four materials having the following compositions, in molecular percentage, $50Fe_2O_3$, $50MnO$
$50Fe_2O_3$, $45MnO$, $5CuO$
$50Fe_2O_3$, $40MnO$, $10CuO$
$50Fe_2O_3$, $30MnO$, $10CuO$, $10ZnO$ The curves of Figures 4, 5 and 6 show that the addition of CuO or NiO molecules makes it possible in a way to adjust the flux density and the coercive field of the cycle of a material having a definite content of $Fe_2O_3$ molecules.

Figure 7:
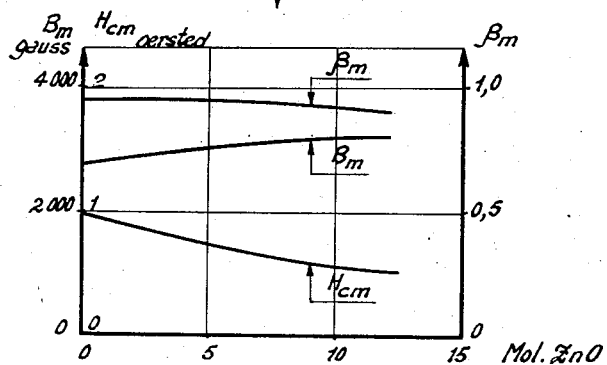
Figure 7 represents the variations of $B_m$, $H_{cm}$ and $\beta_m$ as a function of the molecular percentage of the zinc oxide.

Figure 7 represents, in the case of manganese, copper and zinc ferrite, the variation of the characteristics $B_m$, $\beta_m$ and $H_{cm}$ as a function of the molecular percentages $s$ of ZnO, for ferrites, the starting composition of which are, in molecular percentage, $$50Fe_2O_3, (40-s) \text{ MnO}, 10\text{CuO}, s\text{ZnO}$$

It should be noted that $B_m$ slightly increases while $H_{cm}$ quickly decreases when the content of ZnO molecules is increased, whereas $\beta_m$ does not practically vary and remains comprised between 0.95 and 0.94.

Figure 8:
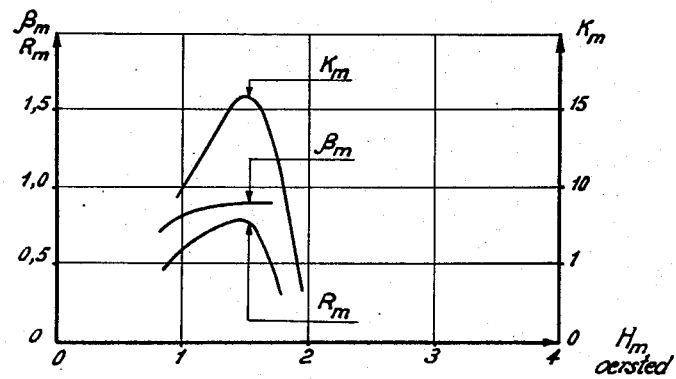
Figures 8, 9 and 10 represent the variations of $\beta_m$, $R_m$ and $K_m$ as a function of the field $H_m$ for some examples of materials according to the invention.
Figure 9:
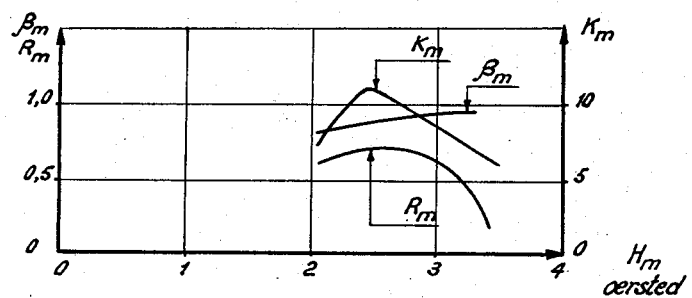
Figure 10:
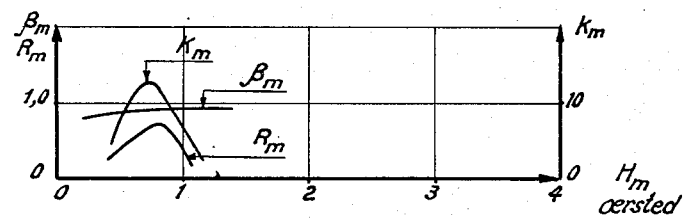

In Figures 8, 9 and 10 the variations of the characteristics $\beta_m$, $R_m$ and $K_m$ are represented as a function of the magnetising field. Figure 8 refers to the material, the molecular composition of which is $50Fe_2O_3$, 35 MnO, 15NiO; $R_m$ and $K_m$ reach their maximum value in the vicinity of a field $H_m$ of 1.4 oersted. Figure 9 refers to a material, the molecular composition of which is $46.7Fe_2O_3$, 32.8MnO, 7.0ZnO, 13.5NiO; $R_m$ and $K_m$ reach their maximum value in the vicinity of a field $H_m$ of 2.50 oersteds; they vary much more slowly in the vicinity of their maximum value than in the example represented in Figure 8.

Figure 10 represents the variations of $\beta_m$, $R_m$ and $K_m$ as a function of the magnetising field $H_m$, for the ferrite having the following composition, in molecular percentage, $$50Fe_2O_3, 30MnO, 10CuO, 10ZnO$$

The field $H_m$ is optimum for a value close to 0.8 oersted for which $$\beta_m = 0.94,\ R_m = 0.77\ \text{and}\ K_m = 11.7$$

The materials corresponding to Figures 8, 9 and 10 were treated under the same conditions as the materials corresponding to Figure 4.

Figure 11:
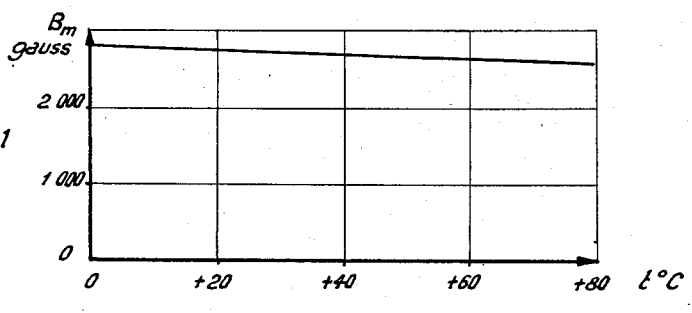
Figure 11 represents the variation of the flux density $B_m$, as a function of the operating temperature, for an example of material according to the invention.

Figure 11 represents the variation of the flux density $B_m$, for a cycle plotted for a field $H_m$ of 2 oersteds, as a function of the operating temperature; the curve refers to a material the composition of which, in molecular percentage, is $$50Fe_2O_3,\ 35MnO,\ 15NiO$$

the material being treated in the same manner as those which correspond to Figure 4.

The value of $\alpha_B$ can be deduced and is equal to 0.2.

Figure 12:
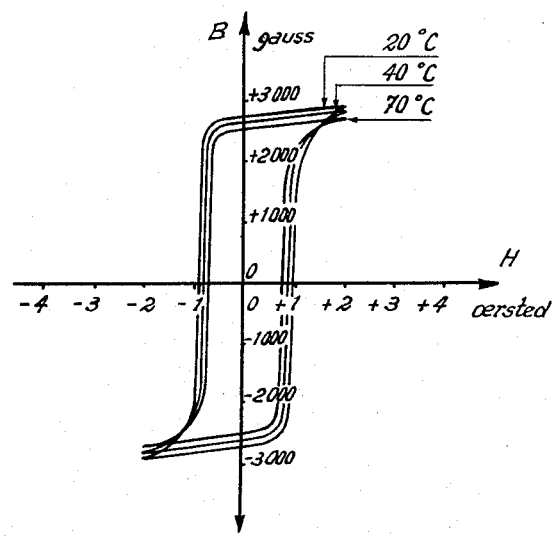
Figure 12 represents hysteresis cycles at different operating temperatures for a material according to the invention.

Figure 12 represents different cycles for a field $H_m$ of 2 oersteds, at different temperatures, for the material which has already been examined in the example of Figure 11. The cycles are plotted for temperatures of 20° C., 40° C. and 70° C.

Figure 13:
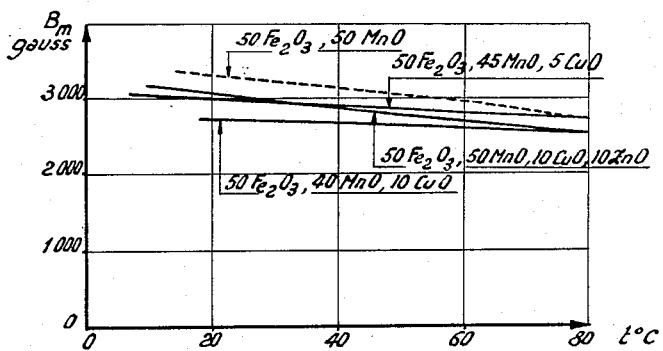
Figure 13 represents the variation of the flux density $B_m$ as a function of the operating temperature for several compositions according to the invention.
Figure 14:
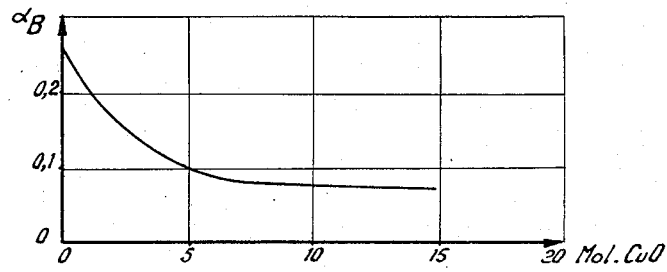
Figure 14 represents the variation of $\alpha_B$ as a function of the molecular percentage of the copper oxide.

Figures 13 and 14 show the influence of CuO molecules upon the variations of the magnetic characteristics as a function of the temperature.

Figure 13 represents the variations of $B_m$ as a function of the temperature for a field of $H_m$ of 2 oersteds, for materials, the compositions of which are, in molecular percentage, $$50Fe_2O_3,\ 50\ MnO$$
$$50Fe_2O_3,\ 45MnO,\ 5CuO$$
$$50Fe_2O_3,\ 40MnO,\ 10CuO$$
$$50Fe_2O_3,\ 30MnO,\ 10CuO,\ 10ZnO$$

Therefore it should be noted that the addition of CuO molecules makes it possible to reduce the variations of $B_m$ as a function of the temperature, between 0 and 100° C., but that the presence of ZnO molecules has the opposite effect.

Figure 14 represents the variations of $\alpha_B$ as a function of the content of CuO molecules of the ferrite, the starting composition of which is, in molecular percentage, $$50Fe_2O_3,\ (50-v)\ MnO,\ vCuO$$

the abscissa being graduated in $v$; it should be noted that, for $v=5$ and $s=0$, there is $$\alpha_B = 0.1$$

METHOD OF MANUFACTURE

Composition and nature of oxides employed

In the mixtures, ferric oxide $Fe_2O_3$, saline manganese oxide $Mn_3O_4$ or even, if desired, manganese oxides $MnO_2$ or $Mn_2O_3$ or MnO or a mixture of these oxides, nickel oxide NiO, copper oxide CuO and zinc oxide ZnO are used.

These oxides must be pure and the mixture must not contain more than 0.5% of impurities.

Silica ($SiO_2$), barium oxide (BaO), lead oxide (PbO), strontium oxide (SrO), etc., are particularly harmful, as the presence of these impurities tend to round the angles of the hysteresis cycle.

The content in each of these impurities must be less than 0.05% in weight.

Grinding

The mixture of oxides is ground in an iron grinder, with steel balls, usually for 12 to 48 hours, with a weight of distilled water of about twice the weight of the mixture of oxides.

Pressing

The influence of the pressure exerted in the pressing operation is considerable. It must be sufficiently great for the moment at saturation of the final product to be sufficiently high and, on the other hand, sufficiently low, for the shrinkage during sintering to be considerable.

A pressure of about 5 metric tons per square centimeter, which corresponds to linear shrinkages of about 15%, has given good results; it is possible to go from 0.5 to 15.0 metric tons per square centimeter.

Heat treatments

The product, obtained as has just been described, is subjected to a heat treatment consisting of a heating at a temperature comprised between 900° and 1,350° C., in pure nitrogen with the addition of 0 to 20% in volume of oxygen, or, in certain cases, in the air, followed by slow cooling carried out for about 15 hours.

In order to obtain the optimum properties, the temperature and atmosphere of annealing must be adjusted experimentally for each composition.

If the initial mixture contains no nickel oxide, the temperature of annealing must be comprised between 900° C. and 1,300° C. Generally speaking, the greater the amount of copper oxide which is contained in the ferrite, the more the annealing temperature will have to be decreased. For a zero content of copper oxide CuO, very good results are obtained at about 1,250° C.; for 10% of CuO, it is necessary to anneal at about 1,200° C. and, for 15% of CuO a temperature of 1,150° C. gives satisfactory results. If the initial mixture contains nickel oxide, the annealing temperature must be comprised between 1,000° C. and 1,350° C. As to the annealing atmosphere, the greater the amount of nickel and copper oxides which are contained in the ferrite, the more the annealing atmosphere will have to be rich in oxygen and, in numerous cases, annealing will be possible in the air. This is very convenient and is one of the characteristics of the invention.

In another embodiment of the invention, the ground powder may undergo, before pressing, a presintering at a temperature comprised between 600° C. and 1,200° C., preferably at about 1,000° C.

The temperature of this presintering must be so adjusted that the final shrinkage of the material is at least higher than 8%.

It has been noticed that, for a mixture which, normally treated, shows good properties of rectangularity, a presintering at too high a temperature (1,200° C. for example) leading to shrinkage of the order of 4%, gives materials having no rectangular hysteresis cycle.

Shrinkage, of the order of 8 to 30%, together with the pressing pressures of the order of 0.5 to 15 tons per square centimeter, and the negative coefficient of magnetostriction of the material, related to the composition, are also part of the characteristics of the invention.

EXAMPLES

The following examples given as non limitative examples show the characteristics of some materials according to the invention.

EXAMPLE 1

Figure 15:
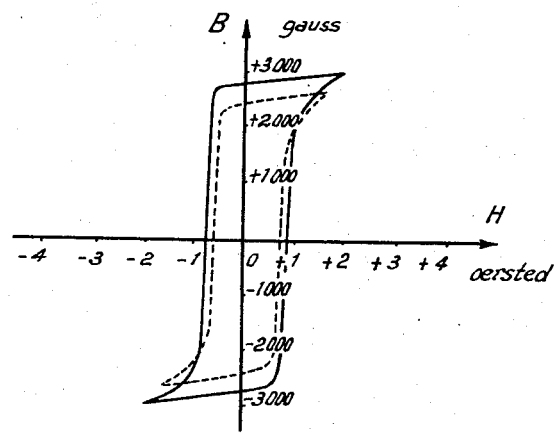
Figures 15 to 19 and 21 to 23 represent hysteresis cycles of materials according to the invention.

Figure 15 represents in full line, the hysteresis cycle, taken in direct current for a maximum field $H_m$ of 2 oersteds on a toroidal core of ferrite having approximately the following dimensions:

|  | Mm. |
|---|---|
| Outer diameter | 34.7 |
| Inner diameter | 27.4 |
| Height | 11.0 |

The starting composition of the material corresponds to the following formula in molecular percentage:

$$50\ Fe_2O_3,\ 40MnO,\ 10NiO$$

The grinding is carried out for 48 hours in an iron mill with a capacity of 16 litres, containing about 3 kilograms of mixture, about 6 litres of water and about 20 kilograms of steel balls.

The annealing is carried out at 1,240° C., for 4 hours, in pure nitrogen with the addition of 1% in volume of oxygen, and cooling takes place in pure nitrogen.

The linear shrinkage is of the order of 13%.

This material shows, for $H_m=10$ oersteds:

A coercive field $H_{cm}=0.9$ oersteds,
A flux density $B_m=3,600$ gauss,
A "coefficient of rectangularity"

$$\beta_m = \frac{B_{rm}}{B_m} = 0.93$$

$P_h=25$,
$P_v=30,000$

And, for $H_m=2$ oersteds:

A coercive field $H_m=0.75$ oersted,
A flux density $B_m=3,000$ gauss,
A "coefficient of rectangularity" $\beta_m=0.96$

EXAMPLE 2

Figure 15 represents, in dashed line, the hysteresis cycle taken in direct current for an $H_m$ of 1.45 oersted, relating to a material the starting composition of which, in molecular percentage, is:

50Fe$_2$O$_3$, 35MnO, 15NiO

The method of manufacture is the same as for Example 1.

For $H_m=10$ oersteds:

$\mu=84$,
$B_m=3,500$ gauss,
$H_{cm}=1.20$ oersteds,
$\beta_m=0.94$,
$B_{rm}=3,300$ gauss,
$\theta_c=380°$ C.

For the optimum field $H_m=1.45$ oersteds:

$B_m=2,300$ gauss,
$H_{cm}=0.85$ oersteds,
$\beta_m=0.95$,
$R_m=0.83$,
$K_m=16$.

This material is suitable for computing machines.

EXAMPLE 3

Figure 16:
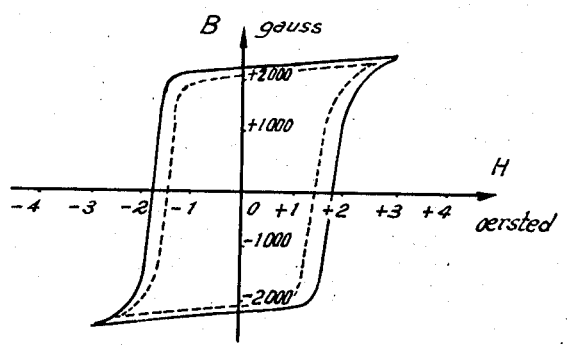

Figure 16 represents, in full line, the hysteresis cycle taken in direct current for a field $H_m$ of 3 oersteds relating to a material, the starting composition of which, in molecular percentage, is:

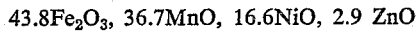
43.8Fe$_2$O$_3$, 36.7MnO, 16.6NiO, 2.9 ZnO

The method of manufacture is the same as for Example 1.

For $H_m=10$ oersteds:

$\mu=60$,
$B_m=3,000$ gauss,
$H_{cm}=2.2$ oersteds,
$\beta_m=0.93$.

For the optimum field $H_m$ of 3 oersteds:

$B_m=2,400$ gauss,
$H_{cm}=1.9$ oersteds,
$\beta_m=0.93$,
$R_m=0.79$,
$K_m=13.7$.

EXAMPLE 4

Figure 16 represents, in dashed line, the hysteresis cycle taken in direct current, for a field $H_m$ of 2.55 oersteds, relating to a material the starting composition of which, in molecular percentage is:

46.7Fe$_2$O$_3$, 32.8MnO, 13.5NiO, 7ZnO

The method of manufacture is the same as for Example 1.

For $H_m=10$ oersteds:

$\mu=80$,
$B_m=3,000$ gauss,
$H_{cm}=2.0$ oersteds,
$\beta_m=0.92$

For the field $H_m=2.55$ oersteds:

$B_m=2,300$ gauss,
$H_{cm}=1.6$ oersteds,
$\beta_m=0.91$,
$R_m=0.74$,
$K_m=11.3$.

EXAMPLE 5

Figure 17:
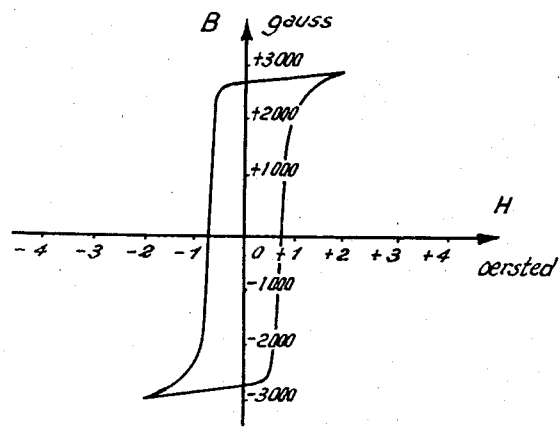

Figure 17 represents the hysteresis cycle taken in direct current, for a field $H_m$ of 2 oersteds, relating to a material the starting composition of which, in molecular percentable is:

50Fe$_2$O$_3$, 40MnO, 5NiO, 5CuO

The method of manufacture is the same as for Example 1.

For $H_m=10$ oersteds:

$\mu=80$,
$B_m=3,400$ gauss,
$H_{cm}=0.8$ oersteds,
$\beta_m=0.94$.

For the field $H_m=2$ oersteds:

$B_m=2,920$ gauss,
$H_{cm}=0.7$ oersteds,
$\beta_m=0.97$.

This material is suitable for magnetic amplifiers where a low coercive field $H_{cm}$ is required.

EXAMPLE 6

Figure 18:
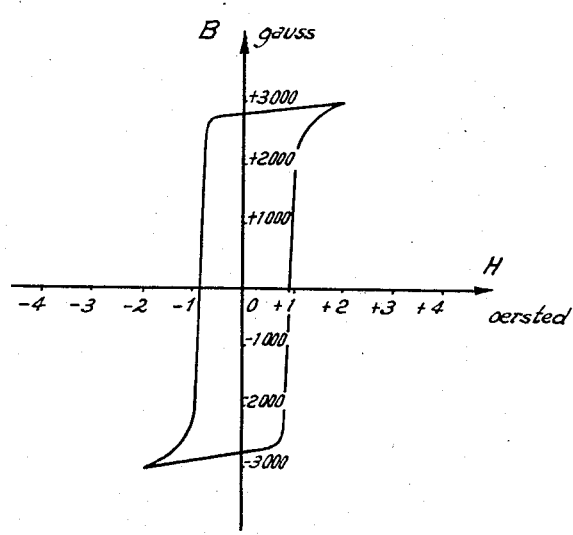

Figure 18 represents the hysteresis cycle taken in direct current for a field $H_m$ of 2 oersteds relating to a material, the starting composition of which, in molecular percentage, is

50Fe$_2$O$_3$, 45MnO, 5CuO

For $H_m=2$ oersteds:

$B_m=3,020$ gauss,
$H_{cm}=0.9$ oersteds,
$\beta_m=0.94$,
$\theta_c=280°$ C.

The method of manufacture is the same as for Example 1, but annealing is carried out at 1,220° C.

Figure 19:
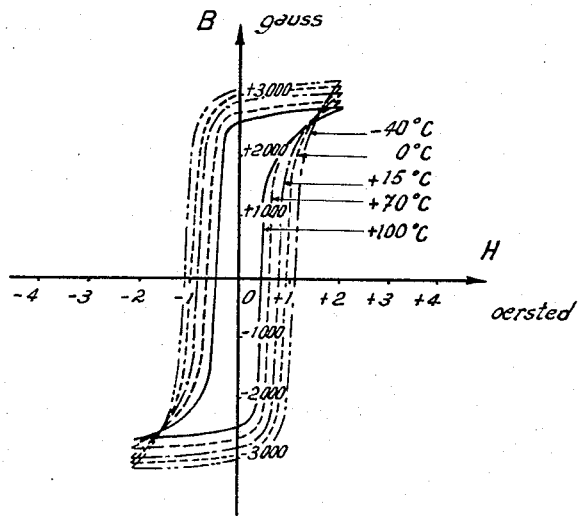

Figure 19 represents the hysteresis cycles of this material, taken for a field of 2 oersteds and at different operating temperatures.

Figure 20:
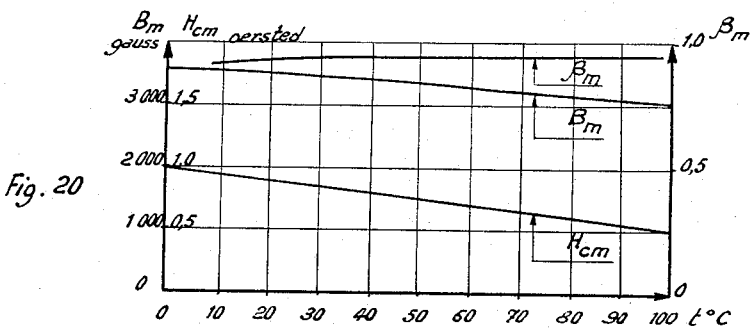
Figure 20 represents the variations of $B_m$, $H_{cm}$ and $\beta_m$ as a function of the operating temperature for a material according to the invention.

Figure 20 represents the variation of $B_m$, $H_{cm}$ and $\beta_m$ as a function of the operating temperature. This figure shows that the variations of these parameters are small.

EXAMPLE 7

Figure 21:
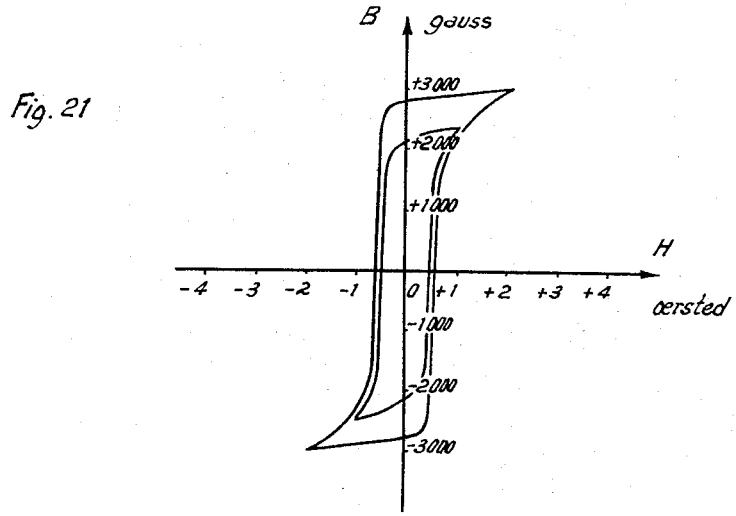

Figure 21 represents, in full line, hysteresis cycles taken on a material, the starting composition of which, in molecular percentage, is

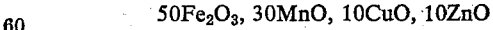
50Fe$_2$O$_3$, 30MnO, 10CuO, 10ZnO annealing has been carried out at 1,200° C., under the same conditions as for Example 1.

For the optimum, that is for a field $H_m$ of 0.8 oersteds (inner cycle of Figure 21), the "coefficient of rectangularity" $\beta_m$ reaches 0.94;

$B_m=2,360$ gauss,
$H_{cm}=0.5$ oersteds,
$R_m=0.77$,
$K_m=11.7$, and, for a cycle taken for a field $H_m$ of 2 oersteds (outer cycle of Figure 21), $B_m=3,100$,
$\beta_m=0.94$,
$H_{cm}=0.6$ oersteds.

EXAMPLE 8

Figure 22:
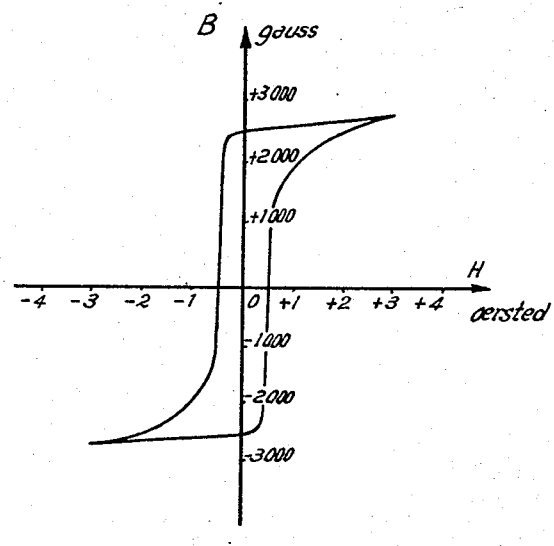

Figure 22 represents, in full line, a hysteresis cycle taken on a material, the starting composition of which, in molecular percentage, is $$40Fe_2O_3, 40MnO, 10CuO, 10ZnO$$

annealing has been carried out at 1,200° C., under the same conditions as for Example 1.

For a cycle taken for $H_m=3$ oersteds, there is $B_m=2,700$ gauss,
$H_{cm}=0.50$ oersteds,
$\beta_m=0.92$.

EXAMPLE 9

Figure 23:
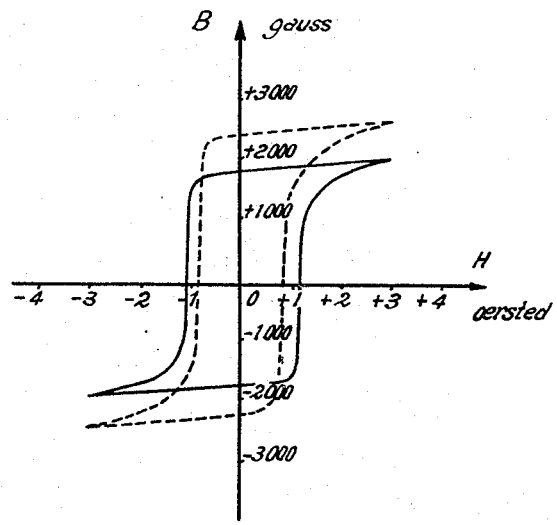

Figure 23 represents, in a dashed line, a hysteresis cycle taken on a material, the starting composition of which, in molecular percentage, is $$45Fe_2O_3, 5Al_2O_3, 40MnO, 10CnO$$

annealing has been carried out at 1,200° C., under the same conditions as for example 1.

For a cycle taken for $H_m=3$ oersteds, there is $B_m=2,500$ gauss,
$H_{cm}=0.80$ oersteds,
$\beta_m=0.92$.

EXAMPLE 10

Figure 23 represents, in full line, a hysteresis cycle taken on a material, the starting composition of which, in molecular percentage, is:

$$45Fe_2O_3, 5Cr_2O_3, 40MnO, 10CuO$$

annealing has been carried out at 1,200° C., under the same conditions as for Example 1.

For a cycle taken for $H_m=3$ oersteds, there is $B_m=2,000$ gauss,
$H_{cm}=1.20$ oersteds,
$\beta_m=0.91$.

What is claimed is:

1. Ferromagnetic material, having a substantially rectangular hysteresis cycle, consisting of the reaction product produced by grinding a homogeneous mixture of fine powders of metallic oxides in an iron grinder with steel balls, for 12 to 48 hours, with a weight of distilled water about twice the weight of the said mixture, pressing the ground mixture to form a core at a pressure comprising between 0.5 and 15 metric tons per square centimeter, and heat treating the core for about 4 hours at a temperature between 900° C. and 1,350° C. in a mixture of nitrogen and of 0 to 20% of oxygen by volume, followed by a slow cooling carried out for about 15 hours in pure nitrogen, the said metallic oxide mixture being formed of oxides of at least one of the trivalent metals of the group consisting of 30 to 50 mol. percent iron, aluminum and chromium, one of which is always ferric oxide, and manganese oxide and of at least one oxide of the group of bivalent metals consisting of 0–20 mol. percent nickel and 0–15 mol. percent copper, the sum of the molecular percentages of manganese oxide, conventionally referred to the number of manganese atoms, and of the molecular percentages of nickel and copper oxides being between 33 and 70, the sum of the molecular percentages of nickel and copper oxides being at least equal to 2 and at most equal to 0.4 times the molecular percentage of manganese oxide.

2. The ferromagnetic material of claim 1, wherein the said oxide mixture includes oxide of trivalent aluminum, the molecular percentage of which is at most one quarter of the molecular percentage of ferric oxide.

3. The ferromagnetic material of claim 1, wherein the said oxide mixture includes oxide of trivalent chromium, the molecular percentage of which is at most one quarter of the molecular percentage of the ferric oxide.

4. The ferromagnetic material of claim 1, and having a magnetic moment at saturation comprised between 1,500 and 4,500 gauss, a coercive field comprised between 0.2 and 3 oersteds, a "coefficient of rectangularity" defined as the ratio $\beta_m$ of the remanent flux density to the maximum flux density at least equal to 0.90, a coefficient of variation of flux density with temperature at most equal to 0.5, a resistivity at least equal to $10^3$ ohms-centimeters and Curie points higher than 150° C.

5. The ferromagnetic material of claim 1, wherein the number of molecules including metals in the bivalent state is substantially equal to the number of molecules including metals in the trivalent state.

6. The ferromagnetic material of claim 1, wherein the mixture of oxides used is subjected to a first grinding, and thereafter to a first heat treatment of presintering in air at a temperature between 600° C. and 1,200° C., then to a second grinding, to pressing and to a second heat treatment at a temperature between 900° C. and 1,350° C.

7. The ferromagnetic material of claim 1, wherein there is added to the said oxide mixture zinc oxide, the molecular percentage of which is at most equal to 15.

8. The ferromagnetic material of claim 7, wherein the total number of molecules including the said bivalent metals and zinc is substantially equal to the number of molecules including metals in the trivalent state.

References Cited in the file of this patent

UNITED STATES PATENTS

| 2,535,025 | Albers | Dec. 26, 1950 |
| 2,715,109 | Albers | Aug. 9, 1955 |
| 2,723,238 | Simpkiss | Nov. 8, 1955 |

FOREIGN PATENTS

| 697,219 | Great Britain | Sept. 16, 1953 |
| 735,375 | Great Britain | Aug. 17, 1955 |
| 737,284 | Great Britain | Sept. 21, 1955 |
| 1,093,965 | France | Dec. 1, 1954 |
| 524,097 | Belgium | Nov. 30, 1953 |

OTHER REFERENCES

"Phillips Technical Review," vol. 16, No. 2, August 1954, pages 49–58.

"R.C.A. Review," vol. XI, No. 3, page 345.